2,919,693

MOUTHPIECE

Harold M. Ross, Chicago, Ill.

No Drawing. Application February 26, 1958
Serial No. 717,553

6 Claims. (Cl. 128—136)

The present invention relates to a mouthpiece such as might be used for protecting the teeth of an individual, and to a process for the manufacture of such a mouthpiece.

There are many instances where it is desirable to have a mouthpiece for protecting the teeth of an individual against the damage that might otherwise be caused by the teeth coming together as a result of a jar or a blow. For example, in many of the so-called contact sports the teeth of the participants are damaged as a result of the blows or jars received while they are engaged in those sports. For some time mouthpieces have been available to protect the teeth of the participants. However, the conventional type mouthpiece available today has many disadvantages. Such mouthpieces usually comprise a shaped channel which is filled with a mastic such as gutta-percha. The process employed to fit the mouthpiece about the teeth of the individual who is to wear it is to boil the mouthpiece in water for several minutes. This softens the mastic so that it can be molded to the teeth. The mouthpiece is allowed to cool sufficiently so that it can be tolerated in the mouth and thereafter it is inserted into the mouth with the individual biting down on the mouthpiece to cause the plastic mastic to shape itself to the teeth of the individual. This mouthpiece is held in that position until the mastic sets. Often this involves a period of time of up to ten minutes. In some instances the setting time is reduced by flushing the mouth with cold water while the mouthpiece is in place.

Such mouthpieces have a number of disadvantages. It is possible to injure the sensitive tissues of the mouth if the mouthpiece is not cooled sufficiently before an effort is made to insert it into the mouth. There is a limited service life to such mouthpieces because after a period of time they become brittle and hard. It is inconvenient not to be able to sterilize the mouthpiece in hot water. Obviously, if the mouthpiece is put in hot water the mastic will again become plastic and the mouthpiece will lose the individual shape that it had to fit about the teeth of a wearer.

The mouthpiece that I have devised overcomes these disadvantages. It may be boiled in hot water to sterilize it. It has an indefinite life because it does not become brittle and hard with age. It is capable of withstanding temperatures, both hot and cold, much in excess of the temperatures that will be encountered in its use for the purposes intended. It is readily formed to fit the exact shape of the teeth of the individual wearer. No heat is required in this process, since the plastic material employed is a polymerizable material as against a thermoplastic material such as was used by the prior art. Another advantage of my invention is that both the channel and the plastic material employed therein to fit about the teeth of the individual are of the same general composition. There will be a chemical bond between the two which prevents any separation of the channel from the material employed therein. It has a relatively short setting time, in the neighborhood of two to five minutes. This setting time may be varied as desired. Thus, during the process of molding the mouthpiece to the individual, it is not necessary that the individual hold his teeth in a fixed position in the mouthpiece for any substantial period of time.

Other objects and advantages will be apparent from the following description. In general my invention comprises the use of a channel formed of silicone rubber. Within this channel is placed a relatively rapid thermosetting plastic silicone rubber. The plastic silicone rubber is a silicone gum stock to which a catalyst has been added which will give it a relatively rapid setting time. When a channel filled with this plastic silicone rubber is placed in the mouth of the individual, with the individual closing his teeth thereover, the plastic silicone rubber flows about the teeth of the individual and will set in that position in a relatively brief period of time. After this setting has occurred, the mouthpiece may be removed and is thereafter available for use at such times as the teeth of the individual are to be protected. When it is desired to sterilize it it may be put in boiling water. It is a unitary mouthpiece since the plastic silicone rubber has chemically bonded to the silicone rubber of which the channel was formed. It remains soft and resilient for an indefinite period of time even though subjected to relatively high or relatively cold temperature conditions.

The forming of the channel from silicone rubber can be performed using conventional practices in the molding of objects from silicone rubber. If desired, it may be formed in a mold using the same materials as are subsequently inserted into the channel as hereinafter described. The specific shape of the channel will depend upon the purpose for which the mouthpiece is to be used and the specific shape of the teeth of the individual to be protected. Channels per se are well known in the art, see for example, United States Patents 2,705,492 and 2,750,941.

When the mouthpiece is to be formed for a particular individual, it is filled with a plastic silicone gum stock, i.e. plastic silicone rubber, to which is added a catalyst to give it a relatively short setting time. This catalyst should not be mixed with the plastic silicone gum stock until immediately before it is to be placed in the mouth of the individual. A specific example of a plastic silicone gum stock would be a plastic methyl polysiloxane. Preferably such a siloxane would have a viscosity centistokes of from about 40,000 to about 100,000 and a specific gravity at room temperature of just slightly over 1.00. Plastic methyl polysiloxanes are available on the open market. A siloxane sold by Dow Corning under their identification number RTV501 falls within the class of materials that is suitable for use in this invention. It has a viscosity centistokes of 60,000 and a specific gravity at 77° F. of 1.15. General Electric also sells a siloxane falling within the same category. It is identified as No. 81726. It has a viscosity centistokes of 50,000–90,000 and a specific gravity of about 1.4 at room temperature. As these siloxanes are generally used for calking, etc., they have a setting time which at room temperature may be as much as a day. Even at elevated temperatures the setting time is measured in hours, after the catalyst provided by the manufacturer is mixed therewith. For use in my invention the siloxane should have added to it a catalyst which will give it a relatively short setting time. By relatively short setting time I mean a setting time measured in minutes as compared to the conventional practices in the art. I prefer to obtain a setting time of substantially less than ten minutes. The catalyst that I prefer for this purpose is a tin octoate. A tin octoate catalyst having a metallic tin content of 28% is ideally suited for this purpose. Roughly the amount of tin octoate catalyst to be added to the plastic methyl polysiloxane is approximately two parts to one thousand parts, by weight, of methyl polysiloxane. There is nothing at all critical about these amounts since the primary effect of varying the amount will be merely to vary the setting time of the methyl polysiloxane. A very wide range of proportions may be employed and still obtain the relatively quick setting time needed for my invention. Furthermore, other factors will change the exact proportions desired for a particular application. Such other factors would be the exact composition of the tin octoate catalyst and the extent to which the methyl siloxane had been already polymerized before the catalyst is mixed therewith. The plastic methyl polysiloxane with the tin octoate catalyst will have a setting time of about three minutes. Thus, within this period of time the catalyst should be mixed with the methyl polysiloxane, the mixture placed in the channel, and the channel with the plastic therein should be inserted into the mouth of the individual and fitted about the teeth of the individual by the individual biting down thereon. The channel should be retained in that position until after the plastic has set. Any time thereafter the channel may be withdrawn. The withdrawal is very simple since the silicone rubber of which the mouthpiece will be formed does not have the property of adhering to the teeth or gums of the individual.

The foregoing description of the invention is for the purpose of compliance with 35 U.S.C. 112 and should not be regarded as imposing any unnecessary limitations on the appended claims inasmuch as modifications will be apparent to one skilled in the art from the description.

I claim:

1. A mouthpiece for an individual comprising a silicone rubber channel having a shape to fit about at least a portion of the teeth of said individual, and a relatively rapid thermosetting plastic silicone rubber chemically bonded in said channel.

2. A mouthpiece or the like for an individual comprising a silicone rubber channel having a shape to fit about at least a portion of the teeth of said individual, and within said channel a silicone gum stock with a catalyst incorporated therein to give said silicone gum stock a relatively short setting time.

3. A mouthpiece or the like for an individual comprising a silicone rubber channel having a shape to fit about at least a portion of the teeth of said individual, a plastic methyl polysiloxane within said channel, and a catalyst incorporated into said methyl polysiloxane to give it a relatively short setting time.

4. A mouthpiece or the like for an individual comprising a silicone rubber channel having a shape to fit about at least a portion of the teeth of said individual, a plastic methyl polysiloxane within said channel, and a tin octoate catalyst incorporated into said methyl polysiloxane to give it a relatively short setting time.

5. A mouthpiece for an individual comprising a silicone rubber channel having a shape to fit about at least a portion of the teeth of said individual, a plastic methyl polysiloxane within said channel, said siloxane having a viscosity, centistokes, of from about 40,000 to about 100,000 and a specific gravity at room temperature of slightly over 1.00, and a tin octoate catalyst incorporated into said siloxane to give it a relatively short setting time.

6. An assembly for a mouthpiece fitted to the teeth of an individual, said assembly comprising: a silicone rubber channel having a shape to be received about at least a portion of the teeth of the individual; and a sufficient quantity of a rapid thermosetting plastic silicone rubber filler for said channel, said filler being chemically compatible with said channel to obtain a chemical bond between the channel and the filler; whereby when the individual holds the channel with the plastic filler therein between his teeth the plastic filler will conform to the shape of his teeth and in a relatively short time the filler will set to produce a unitary silicone rubber mouthpiece fitted to the shape of the individual's teeth and with the filler being chemically bonded to the channel.

References Cited in the file of this patent

UNITED STATES PATENTS

| | | |
|---|---|---|
| 2,705,492 | Chandler | Apr. 5, 1955 |
| 2,750,941 | Cathcart | June 19, 1956 |
| 2,827,899 | Altieri | Mar. 25, 1958 |
| 2,843,555 | Berridge | July 15, 1958 |